United States Patent
Gang

(10) Patent No.: US 8,162,193 B2
(45) Date of Patent: Apr. 24, 2012

(54) CARGO CARRIER WITH VEHICLE ATTACHMENT

(75) Inventor: Wang Gang, Shanghai (CN)

(73) Assignee: Harbor Freight Tools USA, Inc., Calabasas, CA (US)

( * ) Notice: Subject to any disclaimer, the term of this patent is extended or adjusted under 35 U.S.C. 154(b) by 1136 days.

(21) Appl. No.: 12/014,565

(22) Filed: Jan. 15, 2008

(65) Prior Publication Data

US 2009/0180853 A1    Jul. 16, 2009

(51) Int. Cl.
*B60R 11/00* (2006.01)

(52) U.S. Cl. ......... 224/526; 224/521; 224/524; 224/529

(58) Field of Classification Search .................. 224/521, 224/524–530, 325, 326, 511, 522, 523, 531, 224/532, 42.37, 564; 108/57.19, 57.2, 57.22, 108/57.21, 57.23, 57.24, 158.12; 403/335, 403/336

See application file for complete search history.

(56) References Cited

U.S. PATENT DOCUMENTS

| | | | |
|---|---|---|---|
| 1,800,466 A * | 4/1931 | Miller | 224/497 |
| 4,145,976 A * | 3/1979 | Svirklys | 108/56.1 |
| 4,421,300 A | 12/1983 | Lundman | |
| 4,668,002 A | 5/1987 | Hanson | |
| 4,799,609 A * | 1/1989 | Castilla | 224/513 |
| 5,033,662 A * | 7/1991 | Godin | 224/521 |
| 5,538,308 A | 7/1996 | Floe | |
| 5,926,889 A | 7/1999 | Riesselmann et al. | |
| 6,006,973 A * | 12/1999 | Belinky et al. | 224/510 |
| 6,077,007 A * | 6/2000 | Porter et al. | 410/140 |
| 6,179,184 B1 * | 1/2001 | Belinky et al. | 224/510 |
| 6,502,730 B2 * | 1/2003 | Johnson | 224/519 |
| 6,802,441 B1 * | 10/2004 | DuRant et al. | 224/513 |
| 6,834,902 B2 * | 12/2004 | Agan | 296/26.08 |
| 6,837,669 B2 | 1/2005 | Reed et al. | |
| D505,238 S | 5/2005 | Robertson | |
| 7,077,616 B2 | 7/2006 | Wagner | |

* cited by examiner

*Primary Examiner* — Nathan J Newhouse
*Assistant Examiner* — Corey Skurdal

(57) ABSTRACT

The present invention relates to cargo carrier. The cargo carrier attaches to a vehicle and includes a platform, an upper frame, a plurality of vertical supports, a support sleeve and a support beam. The platform itself is constructed from a plurality of longitudinal support members and a plurality of cross members that interfit with each other via a channel design and/or a shoulder and notch system. The platform is then mounted to a vehicle by attaching the support sleeve and support beam to an existing vehicle hitch. Once attached, the platform may be loaded with heavy items for transport.

14 Claims, 3 Drawing Sheets

CARGO CARRIER WITH VEHICLE ATTACHMENT

BACKGROUND OF THE INVENTION

1. Field of the Invention

The present invention relates to a cargo carrier. Specifically, the present invention relates to a light-weight and durable cargo carrier that attaches to a vehicle.

2. Prior Art

Storage space has always been at a premium in vehicles as long as cars have been in existence. The first trunk space ever designed was an actual leather trunk that was suspended from the car with leather straps and buckles.

Over the years there have been many improvements on how to store cargo on a vehicle. With the most prevalent being cargo space being housed within the vehicle. In recent years, however, there has been a trend to have a third row of seats added to sports utility vehicles (SUVs). This third row of seats has severely limited the amount of available store space in the SUVs when the third row is in use.

In order to increase storage space of these SUVs, many types of rear cargo attachments have been manufactured. But the prior art attachments are too heavy, too hard to attach to the vehicle and/or have structurally failed when overloaded. Due to these inadequacies, there is significant commercial interest in the fabrication of a light-weight and durable cargo carrier that has a high weight-bearing capacity.

SUMMARY OF THE INVENTION

To overcome the problems of the prior art, the cargo carrier of the present invention has overcome the weight capacity problem and offers a light-weight and durable carrier for attachment to any vehicle.

The present invention enhances the characteristics of the conventional cargo carrier by constructing a cargo platform that includes an outer frame, a plurality of longitudinal support members and a plurality of cross members. The outer frame includes a lip for holding stored items within the area of the platform as well as welded corners for durability.

The outer frame, the longitudinal support members and the cross members are attached to each other in one of two ways. The first is a channel design wherein the longitudinal support members and outer frame have channels and the cross members are held within the channels. This design may also include support fasteners for fixedly holding the cross members within the channel of the longitudinal supports. The second design is a shoulder and notch system wherein the longitudinal support members and outer frame have shoulders and the cross members have notches. The shoulders tightly fit into and align with the notches.

In order to attach the platform to a vehicle, the platform includes a support sleeve and a support beam. The support sleeve is a hollow chamber that is capable of receiving the support beam. The support sleeve is mounted under the platform and parallel to the cross members while the support beam attaches to a vehicle via a vehicle mount. The support beam and support sleeve support the full weight of the platform. Once the support beam is inserted into the support sleeve, the two are held in place by at least one holding pin that is inserted into openings located on the support sleeve and support beam.

In a second embodiment, the platform may also include an upper frame and a plurality of vertical supports. This extends the vertical holding capacity of the platform so larger items may be stored within the platform area. The upper frame also inhibits cargo from slipping off the platform. The upper frame is held above the platform by vertical supports. These vertical supports are attached to the outer frame and upper frame via fasteners.

In use, the cargo carrier is attached to the vehicle by attaching the platform to a vehicle via the support sleeve and the removable support beam. The removable support beam is capable of being received within the support sleeve and the support beam is removably attached to the vehicle. The sleeve is then inserted onto the support beam and secured to the support beam with holding pins.

BRIEF DESCRIPTION OF THE DRAWINGS

These and other features, aspects, and advantages of the apparatus and methods of the present invention will become better understood with regard to the following description and accompanying drawings where.

DETAILED DESCRIPTION OF THE INVENTION

The present invention enhances the characteristics of cargo carrier by offering a cargo carrier that is lightweight, has high weight-bearing capacity and is easy to install on most vehicles.

Figure 1:
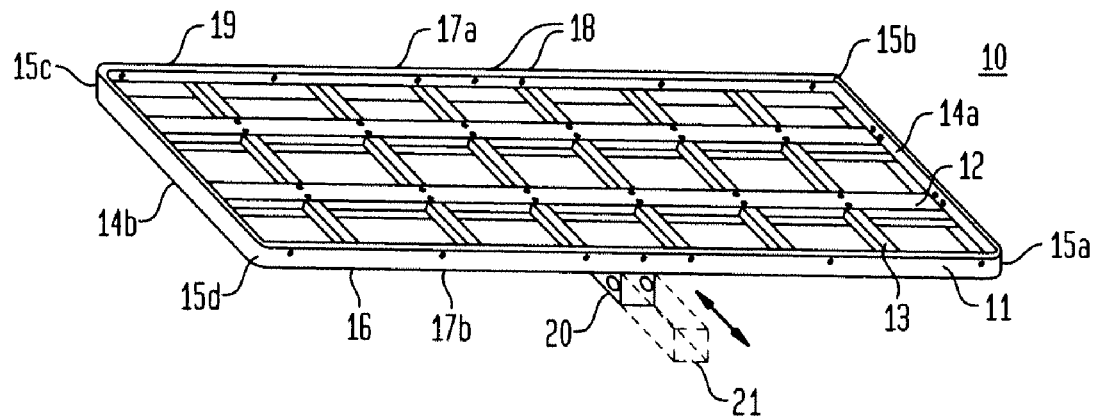
FIG. 1 is a rear prospective view of a platform according to a first embodiment of the present invention.

FIG. 1 shows the cargo carrier 10 according to a first embodiment of the present invention. The cargo carrier 10, in the preferred embodiment, is constructed from extruded aluminum but any alloy and/or plastic having features similar to that of extruded aluminum may be used. This allows the cargo carrier 10 to be lightweight as well as heavy-duty. Under most conditions, the cargo carrier 10 is rated to hold at least 500 lbs but more or less weight is contemplated depending on factors, such as, the thickness of the alloy used.

In the first embodiment, the cargo carrier 10 includes an outer frame 11, a plurality of longitudinal members 12 and a plurality of cross members 13. Each of these components 11, 12, 13 are constructed to form a lightweight, aluminum platform 16. The outer frame 11, the longitudinal members 12 and the cross members 13 are attached to each other by a channel design, a shoulder/notch system or a combination of both as will be discussed in detail below.

The outer frame 11 is constructed of four rods 14a-b, 17a-b that are welded together at their ends 15a-d to form a frame 11 having an area of about 3 to 20 square feet. The four rods 14a-b, 17a-b are composed of two end rail 14a-b and two side rails 17a-b. The end rails 14a-b are about ½' to 2' in length, about ½" to 4" in height and about 1" to 6" in width. The side rails 17a-b are about 1' to 6' in length, about ½" to 4" in height and about 1" to 6" in width. The end rails 14a-b and side rails 17a-b include an interior side (a side which faces into the center of the frame) that has either a channel or a shoulder incorporated into the rails.

The outer frame 11 also includes a lip 19 that extends upwards from the frame 11 about ¼" to about 3". The lip 19 encompasses the entire circumference of the outer frame 11. The lip 19 is utilized so that cargo loaded onto the platform 11 will not slip off the platform 11 and will stay within the area defined by the lip 19. The lip 19 may also have a plurality of holes 18 used for attachment of vertical supports as will be discussed in more detail in the second embodiment of the invention.

The longitudinal members 12, like the outer frame 11, are made of extruded aluminum and each longitudinal member 12 has two sides that attach to the cross members 13. The longitudinal members 12 are about the same length as the side rails 17a-b but may have a wider width, approximately 1" to 6".

Figure 2A:
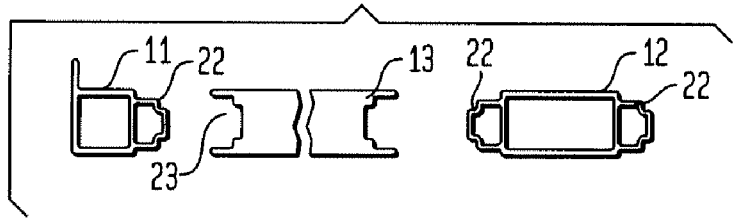
FIGS. 2a-c depict the shoulders and notches according to the present invention.
Figure 2B:
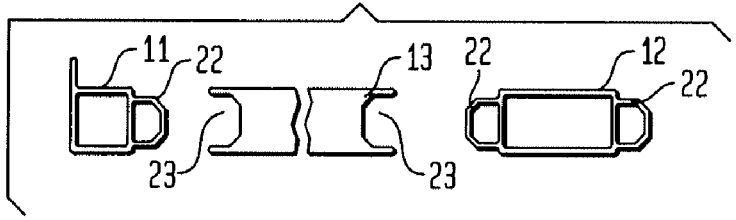
Figure 2C:
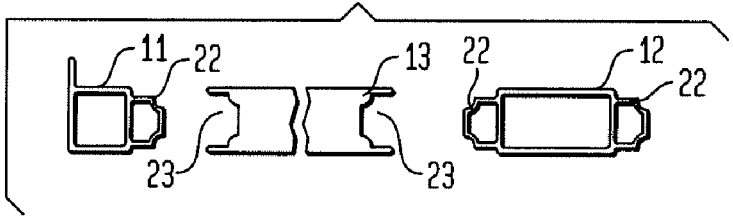
Figure 2D:
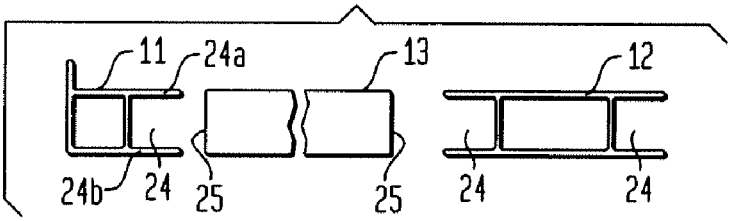
FIG. 2d depicts the channel design according the present invention.

Attached to two sides of the longitudinal members 12 will be shoulders 22 as shown in FIGS. 2a-c or channels 24 as shown in FIG. 2d. These shoulders 22 and/or channels 24 are used to attach the cross members 13 to the longitudinal members 12 and outer frame 11.

The longitudinal members 12 may also include notches located at their ends. These notches will be utilized to attach the longitudinal members 12 to shoulders located on the ends rails 14a-b of the outer frame 11.

The cross members 13 are made of extruded aluminum and each cross member 13 engages the side of the longitudinal members 12 and/or the side rails 14a-b. The cross members 13 are about ½' to 2' in length, about ½" to 4" in height and about 1" to 6" in width. In order to engage the shoulders 22, cross members 13 have ends that are notched 23. The notch 23 is designed to have an opposite design to that of the shoulder 22 so that the shoulder 22 may fit tightly within the notch 23. If a channel design is used the ends of the cross members will be flat 25.

As mentioned above, the outer frame 11, longitudinal members 12 and cross members 13 are joined together in one of two ways. Either a channel type design (FIG. 2d) or a specially designed shoulder and notch system (shown in FIGS. 2a-c).

In the shoulder and notch system, the shoulders 22 are either welded onto the outer frame 11 and/or the longitudinal members 12 or may be formed integral with the outer frame 11 and/or the longitudinal members 12 during manufacture. In either case, the main objective of the shoulders 22 is to hold a sufficient amount of vertical weight during normal use of the platform 11. It also allows the platform 11 to maintain its shape and form. And when in use, the weight of the items to be supported by the platform 11 is supported mainly by the shoulders 22 thereby increasing the weight capacity of the platform 11.

The shoulders 22 are capable of bearing about 100-200 lbs each with a combined weight-bearing capacity of at least 500 lbs. The high-weight bearing capacity comes from the type of weld used to adhere the shoulder 22 to the outer frame 11 and/or the longitudinal members 12 and the thickness of the shoulder 22 itself. In the preferred embodiment, the shoulder 22 is a solid body but shoulders 22 having a hollow interior may be used so long as the shoulder 22 is capable of holding a sufficient amount of weight. The shoulders 22 are made from the same type of extruded aluminum as used for the platform 11 but other light-weight materials are contemplated.

As shown in FIGS. 2a-c, the shoulders 22 may come in many different designs. These designs include but are not limited to a four-sided shoulder that tapers to a flat edge (FIG. 2b) or a four-sided shoulder having a nib formed at the top (FIGS. 2a and 2c). The nib may be four-sided having a flat top or four-sided having tapered top. The shoulders designs used in the present invention are not limited to these designs alone and other shoulders design may become apparent from this disclosure.

During manufacture, the shoulders 22 and notches 23 are tightly fitted together. To further ensure the platform 10 is structurally sound, holes may be drilled through the platform 10 at a near-centered location through the notches 23 and shoulders 22. These holes (not shown) are aligned during manufacture and fasteners (not shown) are inserted through the holes. These fasteners are then fixedly secured so that the cross members 13 do not disengage from the longitudinal members 12 during use.

Instead of the shoulder and notch system, the platform 10 may have a channel design. The channel design has channels 24 that run the full inner circumference of the frame 11 and the full length of two sides of the longitudinal members 12. The channels 24 will have an upper channel 24a and a lower channel 24b. In use, the ends of the cross members 25 and the ends of the longitudinal members 12 will fit into the space created by the upper and lower channel 24a-b of the outer frame 11 and longitudinal members 12. Fasteners (not shown) may then be used to hold the members in place.

To attach the platform 11 to the vehicle 51, the platform 11 has a support sleeve 20 welded to the bottom of the platform 11. This sleeve 20 traverses a central location on the platform 11 and is parallel to the cross members 13. The sleeve 20 is an elongated hollow body that is used to engage a support beam 21. The support beam 21 has a shape that is similar to that of the hollow section of the sleeve 20. In the preferred embodiment, a single sleeve and beam are used but multiple beams and sleeve may be incorporated into the embodiment.

The support beam 21 is a solid body that is capable of holding the weight of the platform 11. The support beam 21 is held to the vehicle by a vehicle mount 50. In the preferred embodiment, the mount 50 is a mount typically found on a conventional trailer hitches but any mount may be used.

The support sleeve 20 and the support beam 21 both have holes 44 that traverse the sleeve 20 and the beam 21. These holes 44 are aligned during use of the platform 11 so that holding pins 40, 42 may be inserted onto the holes 44 and inhibit movement of the sleeve 20 along the beam 21.

Figure 3:
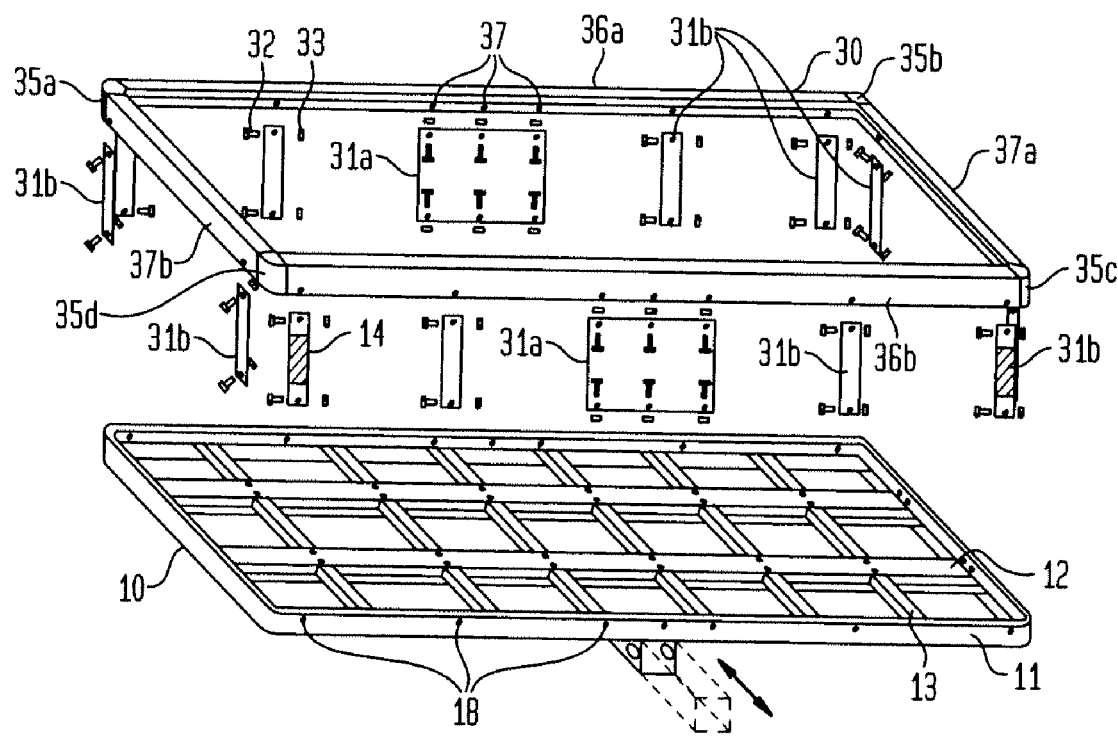
FIG. 3 is a prospective view of an unconnected platform and upper frame according to a second embodiment the present invention.

FIG. 3 shows a second embodiment of the invention wherein the platform 11 is attached to an upper frame 30.

The upper frame 30 is made from four L-shaped rods 36a-b, 37a-b that are welded at the corners 35a-d. The upper frame 30 is about the same circumference as the outer frame 11 is attached to the platform 10 via a number of vertical support rods 31a-b.

The vertical support rods 31a-b suspend the upper frame 30 about 6" to 3' above the platform 10 thereby increasing the vertical load capacity of the cargo platform 10. The vertical support rods 31a-b are attached to the platform 11 and upper frame 30 by holes 18, 38 and fasteners 32.

Figure 5:
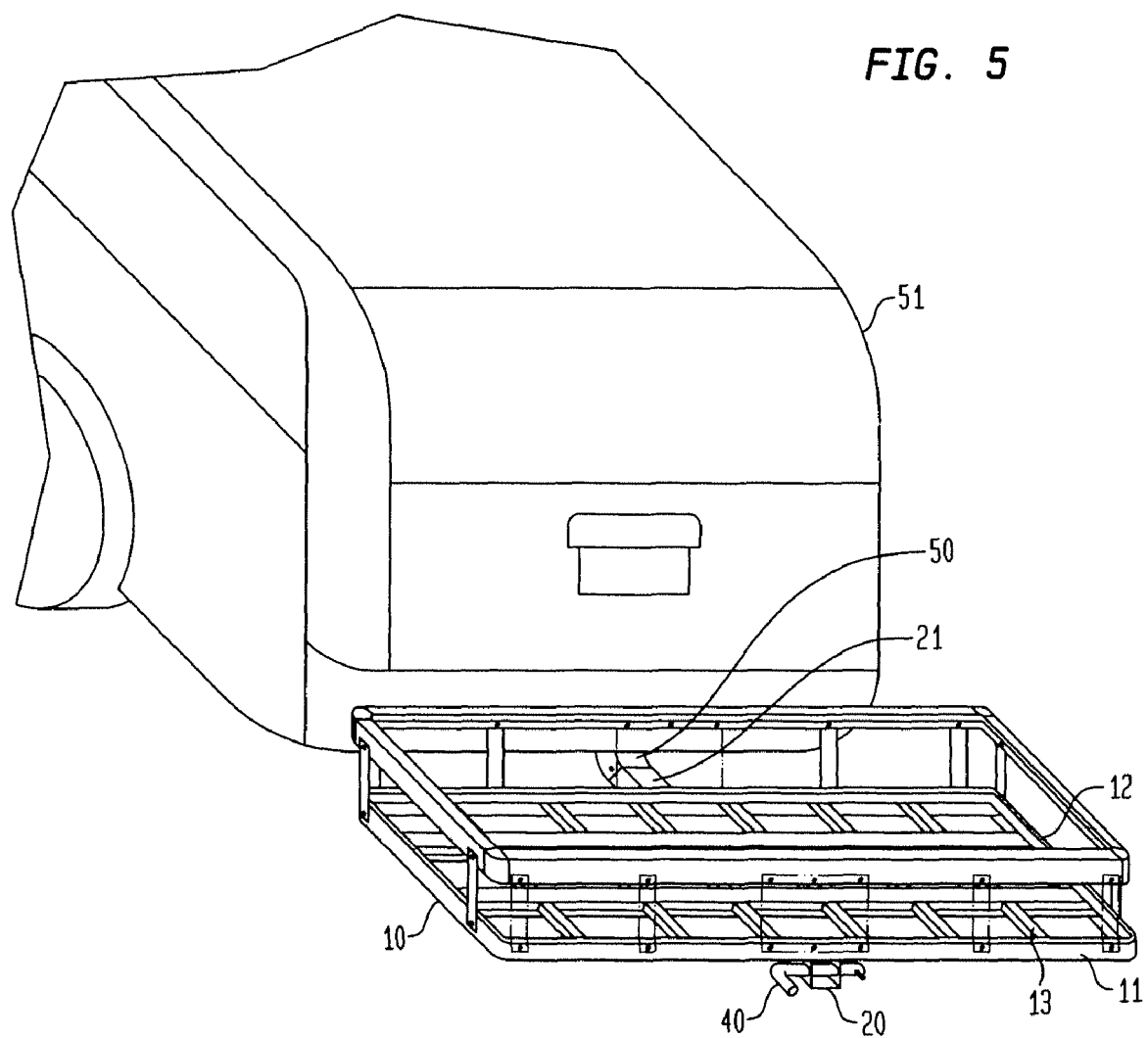
FIG. 5 is a prospective view of an assembled cargo carrier attached to a vehicle.

FIG. 5 shows the second embodiment being attached to the rear of a vehicle 51. In use, the support beam 21 is first attached to the vehicle 51 via an existing vehicle hitch 50 or any other conventional attachment means and then the support sleeve 20 and platform 10 are slid onto the beam 21.

Figure 4:
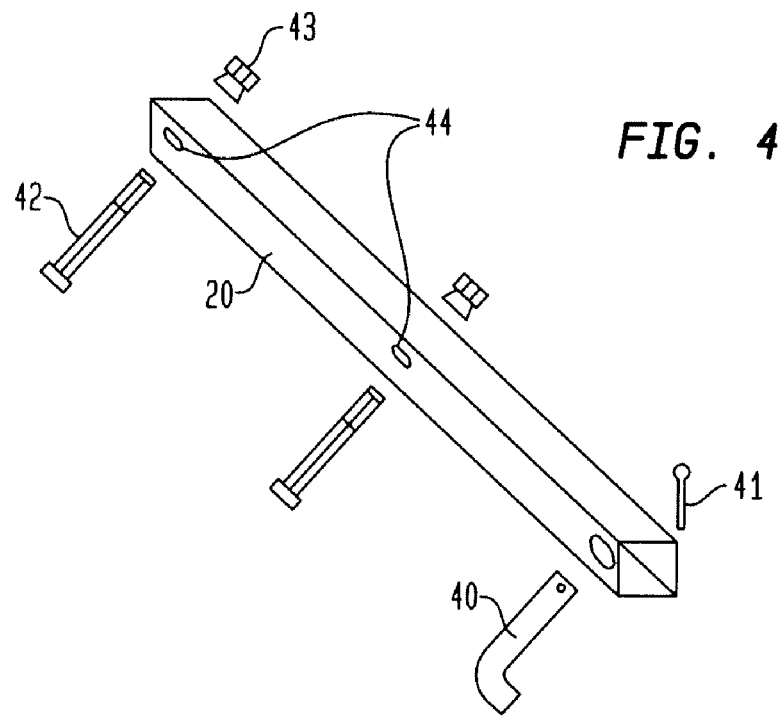
FIG. 4 is a prospective view of a support sleeve of the present invention.

Once in place, the beam 21 and the sleeve 20 are held in place by either a cotter pin 40, 41 and/or a removable screw 42, 43 (as shown in FIG. 4) both which pass through small openings 44 that traverse thorough both sides of the sleeve 20 and completely through the support beam 21. These holes 44 are aligned and the pins 40, 42 are inserted through the opening 44 when alignment is achieved. After the pins are in place, the cargo platform 10 is ready to use and may be loaded with items to be transported.

Although the present invention has been described in detail and with particularity, it will be appreciated by those skilled in this art that changes and modifications can be made therein without departing from the scope and spirit of the invention.

What is claimed:

1. A cargo carrier for attaching to a vehicle comprising:
a platform, the platform including an outer frame, a plurality of longitudinal support members and a plurality of cross members, the outer frame includes side rails and end rails that incorporate a plurality of shoulders on an interior side, the longitudinal support members having two sides that incorporate a plurality of shoulders and two ends that incorporate notches, and the cross members having two ends that incorporate notches, wherein the notches of the longitudinal support members fit tightly onto the shoulders of the end rails of the outer frame and the notches of the cross members fit tightly onto the shoulders of longitudinal support members and the shoulders of the side rails of the outer frame, as need be;
a support sleeve, the support sleeve being attached to a bottom of the outer frame; and
a support beam, the support beam being received within the support sleeve.

2. The cargo carrier of claim 1 further comprising:
an upper frame; and
a plurality of vertical supports.

3. The cargo carrier of claim 1 wherein the shoulders are four-sided.

4. The cargo carrier of claim 3 wherein the shoulders include a nib.

5. The cargo carrier of claim 1 wherein the outer frame includes a lip.

6. The cargo carrier of claim 1 wherein the support beam attaches to a vehicle and supports the platform.

7. The cargo carrier of claim 2 wherein the upper frame inhibits cargo from slipping off the platform.

8. The cargo carrier of claim 2 further comprising:
a plurality of platform fasteners for holding the platform to the vertical supports; and
a plurality of frame fasteners for securing the vertical supports to the upper frame.

9. The cargo carrier of claim 2 wherein the vertical supports support the upper frame above the platform.

10. The cargo carrier of claim 1 further comprising:
a vehicle mount for mounting the cargo carrier to the vehicle.

11. The cargo carrier of claim 1 wherein the support sleeve is mounted under platform and parallel to cross members.

12. The cargo carrier of claim 1 wherein the support sleeve and the support beam include at least one opening that receives at least one holding pin.

13. A method for attaching a cargo carrier to a vehicle comprising the steps of:
providing a platform, the platform including an outer frame, a plurality of longitudinal support members and a plurality of cross members, a support sleeve and a removable support beam, the removable support beam capable of being received within the support sleeve, the outer frame including side rails and end rails that incorporate a plurality of shoulders on an interior side, the longitudinal support members having two sides that incorporate a plurality of shoulders and two ends that incorporate notches, and the cross members having two ends that incorporate notches, wherein the notches of the longitudinal support members fit tightly onto the shoulders of the end rails of the outer frame and the notches of the cross members fit tightly onto the shoulders of longitudinal support members and the shoulders of the side rails of the outer frame, as need be;
attaching the support beam to the vehicle;
inserting the support beam into the support sleeve;
securing the support beam to the support sleeve.

14. The cargo carrier of claim 13 whereby the cargo carrier includes an upper frame and a plurality of vertical supports.

* * * * *